June 15, 1965  A. TATZ  3,189,904
AIRCRAFT LANDING SYSTEMS
Filed Sept. 22, 1961  2 Sheets-Sheet 1

INVENTOR
Abraham Tatz
BY
ATTORNEYS

June 15, 1965

A. TATZ 3,189,904

AIRCRAFT LANDING SYSTEMS

Filed Sept. 22, 1961

INVENTOR
Abraham Tatz
BY
ATTORNEYS

United States Patent Office 3,189,904
Patented June 15, 1965

3,189,904
AIRCRAFT LANDING SYSTEMS
Abraham Tatz, Levittown, N.Y., assignor to Cutler-Hammer, Inc., Milwaukee, Wis., a corporation of Delaware
Filed Sept. 22, 1961, Ser. No. 140,134
12 Claims. (Cl. 343—108)

This invention relates to aircraft landing systems, and particularly to flare-out computers for establishing a suitable path to touchdown.

In application Serial No. 123,928, now Patent No. 3,157,877, filed June 28, 1961, by Tatz and Battle for "Aircraft Landing System," an aircraft landing system is described utilizing elevation guidance beam transmissions from a pair of sites adjacent a runway and spaced therealong. Preferably both beams are narrow in the vertical plane and repeatedly scan in the vertical direction. The beams are coded in terms of their respective elevation angles, and further coded for identification, so that an aircraft with suitable decoding equipment can determine its angle from each of the two sites as the angles change. Alternatively, the guidance beam transmission from the front site may be for a fixed angle. Azimuth guidance is provided by a conventional localizer beam, or by a scanning beam employing the same techniques used for elevation.

The path that an aircraft should follow in performing a landing maneuver may be divided into two portions, namely, glide and flare-out portions. During the glide portion, a straight line path at an angle determined by the characteristics of the aircraft normally suffices. With a scanning beam employed at the front site, the angle may be selected as desired, whereas with a fixed front site beam transmission the angle is determined by the characteristics of the ground installation. At a suitable transition point during the landing maneuver, commonly referred to hereinafter as the "switch-over" point, the flare-out maneuver begins. During flare-out, the rate of descent is gradually reduced so that the aircraft contacts the runway sufficiently gently and smoothly.

As described in the aforesaid application, the beam from the front site may be utilized in the aircraft to establish the initial glide path, the scanning beam from the rear site may be used to establish the flare-out path, and both beams used to determine the switch-over point. More elaborate systems are possible utilizing both beams to establish the glide path.

Several types of computers are described in the aforesaid application for determining the switch-over point and computing a suitable flare-out path. In one, the angle information is converted into horizontal and vertical distance components, and these distances and the rates of change thereof are used in the computation. In another, the angle and rate of change of angle from the rear site are used in the computation.

The present invention is directed to the provision of a computer utilizing the angle from the rear site and the rate of change thereof in a simple, direct manner which leads to a simpler computer as well as operationally desirable characteristics.

An important aspect of the present invention is the establishment of a final terminal angle for touchdown. Paths which exponentially approach touchdown, or in general which establish a continuously decreasing slope, are subject to the disadvantage that the point of touchdown on the runway may vary considerably with comparatively small changes in the parameters determining the path. Thus, changes in speed during flare-out, sudden up or down drafts, errors in following the computed path, etc. may result in a considerable change in the point of touchdown. By employing a fixed terminal angle to touchdown, changes in the point of touchdown due to the above factors may be substantially reduced.

With such a fixed terminal angle, if the aircraft speed is greater than expected, the rate of descent at touchdown will be somewhat increased and result in a somewhat harder landing. Similarly, an aircraft speed less than expected will result in a somewhat softer landing. However, the terminal angle may be selected for a given aircraft so that the rate of descent at touchdown will not exceed a prescribed limit over a range of landing speeds normally expected for that aircraft.

The relatively fixed point of touchdown assures that there will be an adequate length of runway available for bringing the aircraft to a halt.

In accordance with the present invention, computing means are provided which utilize the rear site angle signal for computing angle and angular rate of change relationships for a flare-out path from the switch-over point to the predetermined constant terminal angle. An error signal is then produced representing departures of the aircraft from the computed relationships and terminal angle, and the error signal used to give a "fly up" or "fly down" indication to the pilot or to control an automatic pilot. The computation is performed in such a manner that there is no discontinuity in angle or rate of change of angle as the terminal angle is reached, so that transients which might confuse the pilot or affect automatic pilot operation are avoided.

Several relationships between angle and angular rate of change from switch-over to terminal angle are given hereinafter. In one specific relationship of general applicability to many types of aircraft, the ratio of the difference between the rear site and terminal angles to the rate of change of the rear site angle is substantially directly proportional to time remaining before touchdown. In another specific relationship, also of general applicability to a wide variety of aircraft, the ratio of the difference angle to the rate of change of angle is a factor which also decreases as the time to touchdown decreases, but constants are employed which allow a greater freedom in the choice of path to the terminal angle. In another specific relationship, particularly applicable for relatively small glide angles, the aforesaid ratio is maintained substantiallly constant. The particular relationship employed may be selected to best suit the requirements of a particular application.

The invention will be more fully understood by reference to the following description of specific embodiments thereof.

Figure 1:
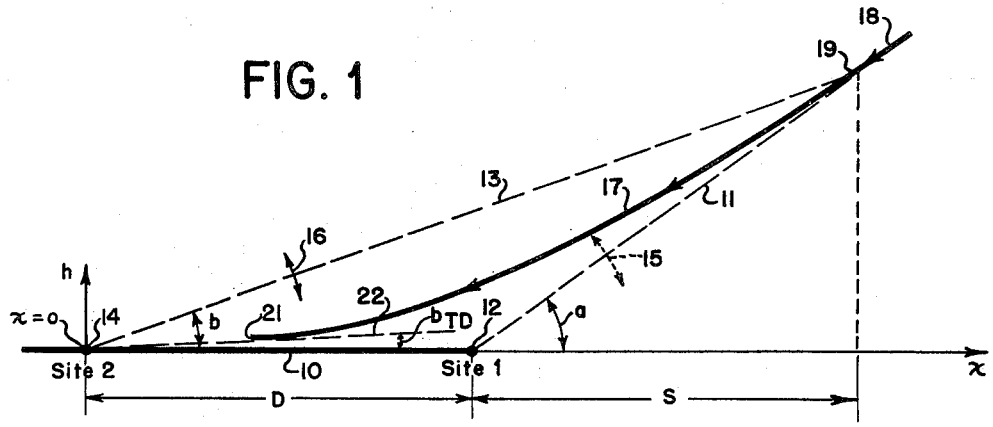
FIGS. 1 and 2 illustrate landing paths for an aircraft in accordance with the invention.

Referring now to FIG. 1, a runway is represented at 10. At or near the front of the runway, at Site 1, is an antenna transmitting a guidance beam whose center line is shown at 11. The origin of this guidance beam is denoted 12. Part way down the runway, at Site 2, is an antenna transmitting another guidance beam whose center line is 12. The original of this beam is denoted 14. In practice, the antennas will have a finite height, say, an effective height of the order of five feet, so that the beams will not originate actually at the surface of the runway. Also, the antennas will commonly be located somewhat to the side of the runway so as not to obstruct the runway.

The receiving antenna in the aircraft will commonly be considerably above the wheels, say ten to twenty feet. The heights of the transmitting and receiving antennas may be taken into account in establishing the flare-out path so that the aircraft substantially reaches the terminal angle prior to touchdown. Since commonly the point of touchdown will be a considerable distance in front of the rear site, and the switchover point will be considerably in front of the front site, in practice the beams may be considered to originate along the center line of the runway without substantial error.

For simplicity of presentation the beams from the two sites will be treated hereinafter as though they originated at the surface of the runway and on the center line thereof, since the actual physical situation in a given application may readily be taken into account by those skilled in the art when necessary.

As shown in FIG. 1, horizontal and vertical (height) distances are measured along rectangular coordinates $x$ and $h$, the origin being at Site 2.

The angle of the beam from the front Site 1 is denoted $a$. If the front site transmits a scanning beam, as is preferred, the angle will vary as indicated by the dotted double-headed arrow 15. This permits the glide angle to be selected as best suits the characteristics of the aircraft. Or, angle $a$ may be fixed, as in the ILS system now installed at many airports. The beam at the rear Site 2 is a scanning beam coded in terms of its elevation angle $b$. Consequently, with suitable decoding equipment in an aircraft, the angle of the aircraft from Site 2 can be continuously determined during the landing maneuver.

A landing path for the aircraft is shown at 17. Initially, during the glide portion 18 of the maneuver, an aircraft flies along a path making a substantially constant angle with respect to Site 1. The switch-over from glide to flare-out portions is at point 19. As the aircraft proceeds past point 19, it will be observed that the slope of path 17 gradually decreases until shortly before the aircraft touches down at point 21. Point 21 is somewhat above the runway 10 due to the height of the aircraft antenna above the landing wheels.

In conventional aircraft the so-called "pitch attitude" of the aircraft primarily determines the forward and downward velocities for a given throttle setting. Thus, for a given aircraft, the pitch attitude is the primary factor controlling the path of the aircraft for a given throttle setting. Generally, the landing speed of a particular aircraft is held within a fairly narrow range, and will be reasonably constant during the flare-out maneuver. However, since the speed may change, or may not be known exactly, it is desirable to establish a landing path which will bring the plane to touchdown reasonably near a selected point regardless of such variations. Also, during flare-out sudden gusts of wind may affect both speed and height.

In order to bring the aircraft to touchdown at or near a given point on the runway regardless of such factors, in accordance with the present invention a fixed terminal angle is established, as indicated by line 22. This terminal angle may be selected with respect to the aircraft characteristics so that the rate of descent at touchdown will not exceed a prescribed rate determined by the ruggedness of the plane and its use. For commercial airplanes a rate of descent not exceeding about two feet per second is desirable, whereas for military planes it is sometimes considerably greater. For space vehicles an even greater rate of descent may be permissible. Knowing the speed range for landing a given aircraft, the terminal angle may be selected so that the rate of descent does not exceed the desired maximum. For many types of planes currently in use, an angle of approximately ½° is satisfactory.

For a given touchdown angle, a given aircraft, and a given height of antenna above the wheels, the actual point of touchdown will be substantially the same regardless of the speed of the aircraft provided that the flare-out path substantially reaches the terminal angle represented by line 22 prior to actual touchdown.

The manner in which a suitable flare-out path may be prescribed will now be developed. For landing under pilot control, an error signal proportional to departures from the prescribed path is usually displayed by an indicator to yield "fly up" or "fly down" information. For automatic pilot systems, an error signal is commonly employed for control purposes, and the manner in which the error signal varies with departures from the prescribed path is selected to meet the requirements of the particular automatic pilot system and the characteristics of the aircraft in which it is installed.

An error signal in terms of angle error will usually suffice as an input to a pilot indicator. However, a pitch attitude rate signal may be employed in automatic pilot systems to change the pitch attitude as required. In one such system the pitch attitude rate signal may be expressed as $\ddot{h}/-\dot{x}$, where $h$ and $x$ are as shown in FIG. 1.

In this expression, and in the equations hereinafter, a single dot ( $\cdot$ ) above a quantity means the first derivative with respect to time, and a double dot ( $\cdot\cdot$ ) the second derivative with respect to time. Hence $\ddot{h}$ is vertical acceleration and $\dot{x}$ is horizontal velocity.

The negative sign in the above expression for pitch attitude rate is employed in order that a positive rate signal shall correspond to "pitch up," and a negative rate signal to "pitch down," it being understood that with the choice of coordinates in FIG. 1 the movement of the aircraft is in the $-x$ direction.

Figure 3:
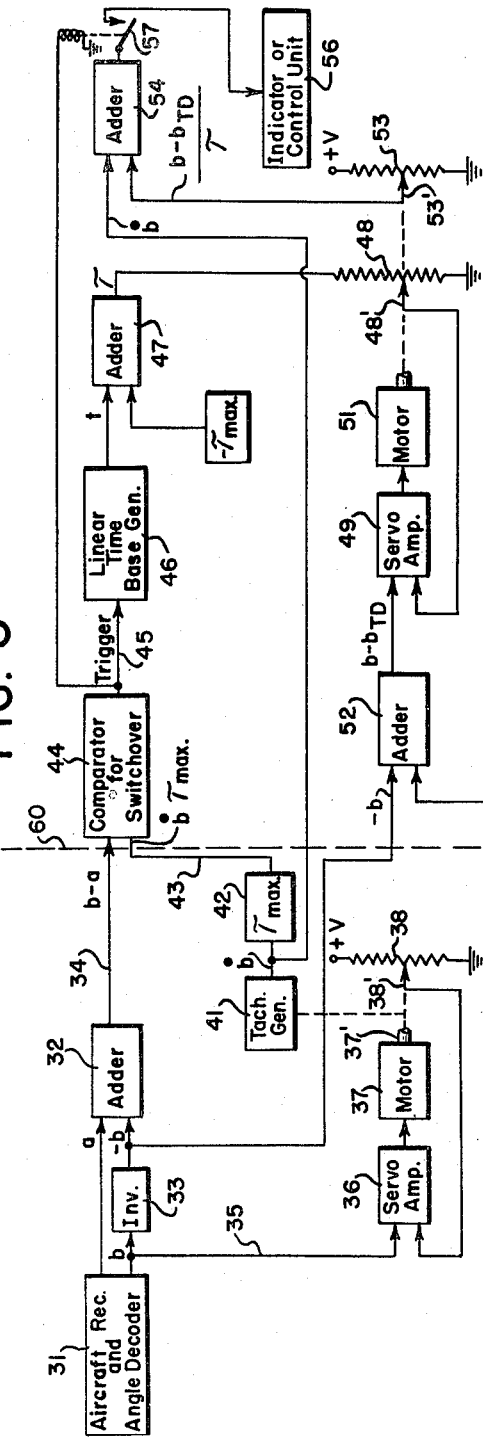
FIG. 3 shows one embodiment of a flare-out computer in accordance with the invention which yields pitch attitude rate information.

As will be noted, the above pitch attitude rate signal involves rates of change of distances. The first embodiment of the present invention, shown in FIG. 3, provides a rate signal output which can be used in the same manner in an automatic pilot system, but in which angle and rate of change of angle relationships are employed rather than vertical acceleration and horizontal velocity relationships, and in which a fixed terminal angle is incorporated. Before describing FIG. 3, the theoretical basis thereof will be developed.

Height of the aircraft and its horizontal distance from Site 2 may be related to the angle $b$ as:

$$h = bx \qquad (1)$$

Strictly, tan $b$ should be employed, but for the small angles commonly employed during flare-out the tangent variation with angle is substantially the same as the variation in the angle itself.

The first time differential of Equation 1 is:

$$\dot{h} = \dot{b}x + x\dot{b} \qquad (2)$$

A second differentiation yields:

$$\ddot{h} = 2\dot{x}\dot{b} + x\ddot{b} \text{ (approx.)} \qquad (3)$$

In Equation 3 the second derivative $\ddot{x}$ is assumed to be negligible, corresponding to a relatively constant forward velocity. Thus, the pitch attitude rate becomes:

$$\text{Pitch attitude rate} = \frac{\ddot{h}}{-\dot{x}} = -2\dot{b} - (x/\dot{x})\ddot{b} \qquad (4)$$

The quantity $x/-\dot{x}$ is distance divided by horizontal velocity, the negative sign for $\dot{x}$ denoting velocity toward the origin (Site 2). The symbol $\tau$ will be used to denote time to go to the terminal touchdown condition. Since $x/-\dot{x}$ corresponds to time to go, Equation 4 can be expressed as:

$$\text{Pitch attitude rate} = -2\dot{b} + \tau\ddot{b} \qquad (5)$$

In general, the flare-out path can be expressed by the following power series, higher terms being neglected:

$$b = p_0 + p_1\tau + p_2\tau^2 + p_3\tau^3 \ldots \qquad (6)$$

Using $T_{max}$ to denote time of switch-over, and $t$ to denote time elapsed after switch-over:

$$\tau = \tau_{max} - t \qquad (7)$$

Differentiating Equation 7 yields $\dot{\tau} = -1$. Accordingly the following equation can be derived:

$$db/d\tau = (db/dt)(dt/d\tau) = \dot{b}/\dot{\tau} = -\dot{b} \qquad (8)$$

Differentiating Equation 6 with respect to $\tau$ and using Equation 8:

$$-\dot{b} = p_1 + 2p_2\tau + 3p_3\tau^2 \qquad (9)$$

Similarly, differentiating Equation 9 with respect to $\tau$ and using $\dot{\tau} = -1$:

$$\ddot{b} = \frac{d\dot{b}}{d\tau} \cdot \frac{d\tau}{dt} = 2p_2 + 6p_3\tau \cdots \qquad (10)$$

As above discussed, the final portion of the desired flare-out path is a constant small angle which will be denoted $b_{TD}$. Thus the terminal conditions for $\tau = 0$ are $b = b_{TD}$ and $\dot{b} = 0$. Using these terminal conditions, from Equation 6 it will be seen that $p_0 = b_{TD}$. From Equation 9, $p_1$ equals zero.

By solving Equations 6 and 9 simultaneously, the other constants are obtained as follows:

$$p_2 = \frac{3(b - b_{TD}) + \dot{b}\tau}{\tau^2} \qquad (11)$$

$$p_3 = \frac{2(b - b_{TD}) + \dot{b}\tau}{-\tau^3} \qquad (12)$$

Substituting these constants in Equations 9 and 10, and then substituting the latter in Equation 5 yields:

$$\text{Pitch attitude rate} = 6\left[\frac{(b_{TD} - b)}{\tau} - \dot{b}\right] \qquad (13)$$

In practice, the characteristics of an aircraft will affect the response of the aircraft to a pitch attitude rate signal to change its rate of descent. Consequently, for a given aircraft a constant other than "6" in Equation 13 may be desirable for optimum performance. Accordingly, in general, the pitch attitude rate may be expressed as:

$$\text{Pitch attitude rate} = C\left[\frac{b_{TD} - b)}{\tau} - \dot{b}\right] \qquad (14)$$

With close control of the aircraft by the automatic pilot system, the pitch attitude rate given by Equation 14 will tend toward zero. Thus the path obtained by equating Equation 14 to zero may be considered to be the prescribed path, even though the aircraft will depart therefrom to a greater or less degree depending on the effectiveness of the control. This yields:

$$\frac{(b_{TD} - b)}{\dot{b}} = \frac{(b - b_{TD})}{-\dot{b}} = \tau \qquad (15)$$

Thus the ratio of the angle difference to the rate of change of angle decreases as time to touchdown decreases.

Since $\tau$ represents time to go to the terminal touchdown condition, after switch-over, it is necessary to determine $\tau_{max}$, which is the time at which switch-over occurs. This may be computed from the angles $a$ and $b$ from front and rear sites.

As will be clear from the discussion of FIG. 1, prior to switch-over the aircraft will be traveling at a constant angle with respect to the front site. Using angles rather than tangents as discussed above, at any point along the glide path the height of the aircraft is related to the angles from rear and front sites as follows:

$$h = bx = a(x - D) \qquad (16)$$

By differentiating Equation 16 with respect to time, and bearing in mind that $\dot{a}$ is zero prior to switch-over:

$$x\dot{b} = (a - b)\dot{x} \qquad (17)$$

Assuming a constant horizontal velocity from switch-over to touchdown:

$$T_{max} = x/-\dot{x} = \frac{a - b}{\dot{b}} \text{ at switch-over} \qquad (18)$$

It will therefore be seen that $\tau_{max}$ for switch-over is a constant, and the switch-over point can be established by determining when the ratio of the difference between the angles from front and rear sites to the rate of change of angle from the rear site is equal to a predetermined constant. Having determined switch-over in this manner, the departures from the desired flare-out path may be computed in accordance with Equation 14.

It should be pointed out that, although the development of Equation 18 assumes a constant speed from switch-over to touchdown, it is not necessary for the aircraft speed to remain constant during the flare-out in order to touch down at substantially a given point, provided that the aircraft substantially reaches the terminal angle $b_{TD}$ prior to actual contact with the runway. Inasmuch as the terminal angle is fixed with respect to the rear site, the actual point of touchdown will be determined by the terminal angle selected, the effective height of the rear site antenna above ground, and the effective height of the aircraft antenna above the wheels, if the aircraft accurately follows the prescribed path.

It should also be noted that the terminal angle $b_{TD}$ is a parameter of the aircraft computer itself, and not dependent on the ground installation, since the beam from rear Site 2 is continuously scanning. Accordingly, the terminal angle can be selected for a given aircraft in accordance with its own characteristics.

Referring now to FIG. 3, a computer is shown for instrumenting Equations 18 and 14. An aircraft receiver and angle decoder 31 is provided for receiving transmissions from Sites 1 and 2 and yields signal outputs $a$ and $b$ corresponding to the then-existing angles from the two sites. If the beam from the front site is fixed rather than scanning, as in the present ILS system, a signal representing $a$ may be introduced as a constant, it being assumed that the aircraft will be flown along the fixed beam path with sufficient accuracy. The angle $b$ signal, however, will be a function of the elevation angle from the rear site as the angle changes during landing, and is preferably directly proportional thereto.

The angle $a$ signal is supplied to an adder 32. The angle $b$ signal is supplied through inverter 33 to adder 32 so as to invert its polarity and hence correspond to $-b$. Adder 32, as well as the other adders employed, is assumed to be of a type which inverts the polarity of the signals supplied thereto. Accordingly, the output in line 34 will correspond to $(b - a)$.

The angle $b$ signal is also supplied through line 35 to a servo-system including a servo-amplifier 36, motor 37 and potentiometer 38. Potentiometer 38 is supplied with a constant voltage denoted $+V$ and the voltage at the slider 38' is fed back to the input of amplifier 36. The output of the amplifier drives motor 37, and the shaft 37' is mechanically coupled to drive slider 38'. Due to the feedback, the position of slider 38' will be driven to maintain the voltage thereat equal to the input voltage in line 35, and hence its position will correspond to $b$. Such a servo-system is known in the art and its operation well understood.

Shaft 37' is mechanically coupled to a tachometer generator 41 which gives a D.-C. output proportional to the speed of rotation of shaft 37'. Hence, the output of generator 41 is $\dot{b}$, as indicated. The generator output is supplied to a block 42 which multiplies the input $\dot{b}$ by $\tau_{max}$. Block 42 may contain an amplifier, for example, whose gain is selected to yield an output in line 43 proportional to $\dot{b}\tau_{max}$. $\tau_{max}$ may be inserted as an invariant, or provision may be made for the pilot to select its value in view of existing conditions.

The quantities $(b-a)$ and $\dot{b}\tau_{max}$ are supplied to a comparator 44 which yields an output in line 45 when the two inputs become equal. Equation 18 may be rearranged to read:

$$\dot{b}\tau_{max}=b-a \qquad (19)$$

It will therefore be seen that the two sides of the equation are the two inputs to comparator 44 so that an output in line 45 corresponds to the solution of the equation.

This output is supplied to a linear time base generator 46 to initiate the time base. Consequently the output of generator 46 will be proportional to $t$ as indicated, where $t$ represents time after switch-over. This is supplied to adder 47 along with the selected value of $\tau_{max}$, inserted as a negative quantity. With polarity inversion in adder 47, its output will be $\tau$, in accordance with Equation 7. This is supplied to potentiometer 48.

Potentiometer 48 is included in a servo-system including amplifier 49 and motor 51, similar to the previous servo-system. An adder 52 is supplied with $-b$ from inverter 33 and also with $b_{TD}$. The latter may be fixed for the particular aircraft, or may be of selectable magnitude depending on operating conditions. The output of adder 52 will accordingly be $(b-b_{TD})$ and is supplied to servo-amplifier 49.

By the servo action, the position of slider 48' will be continuously adjusted so that $(b-b_{TD})$ equals $k\tau$, where $k$ is the fraction of the total potentiometer resistance which is between slider 48' and ground. The shaft of motor 51 is mechanically connected to drive slider 53' of potentiometer 53 supplied with a fixed D.-C. voltage from $+V$. Thus, the voltage of slider 53' will be proportional to $(b-b_{TD})/\tau$, as indicated.

The latter is supplied to adder 54 along with $\dot{b}$ from tachometer generator 41. Accordingly, the output of adder 54 will correspond to Equation 14, taking into account the inversion of each of the input signals as they appear in the output. This output is the pitch attitude rate signal and is supplied to an indicator or control unit 56 through switch 57. The latter is controlled by the switch-over trigger signal from comparator 44 so that, as soon as switch-over takes place and the flare-out path begins, unit 56 will be supplied with the pitch attitude rate signal.

Unit 56 may be an error indicator of conventional type to indicate whether the pilot should fly up or fly down to follow the computed path. In the form given in Equation 14 an overall negative value corresponds to "fly down" and a positive value "fly up." Or, unit 56 may be a control unit in an automatic pilot system and the pitch attitude rate signal used to change the pitch attitude of the aircraft to follow the computed path.

The generator and adder units shown in FIG. 3 will in general have proportionality constants between the inputs and outputs thereof. These may be selected to yield an overall constant C for Equation 14 of the desired value.

It will be noted that the functioning of the servo system and potentiometers 48 and 53 is to perform a division by $\tau$ as required by Equation 14. Since $\tau$ goes to zero as the terminal touchdown condition is reached, the computed quantity should go to infinity if the numerator is finite, which is impossible to compute. As is customary in the computer art, this situation may be avoided by placing a small but finite limit on how closely $\tau$ may approach zero. In the embodiment of FIG. 3, this may be accomplished by limiting the maximum excursion of the time base generator 46.

Certain departures from the theoretical equations developed hereinbefore may be made in practice, to suit the requirements of a particular application. During the final portion of the landing maneuver the nose of the aircraft is commonly brought up, thereby somewhat decreasing its forward speed. With a value of $\tau_{max}$ selected on the basis of a constant forward speed, $\tau$ will then reach zero (or its final limited value) before actual touchdown. This means that the terminal angle will be reached before touchdown, which in general is desirable. Also, with a lower limit imposed on $\tau$, the actual terminal angle may be slightly different from that selected to perform the computation. These factors may accordingly be adjusted to suit the characteristics of the aircraft, and the conditions surrounding the landing thereof.

Figure 4:
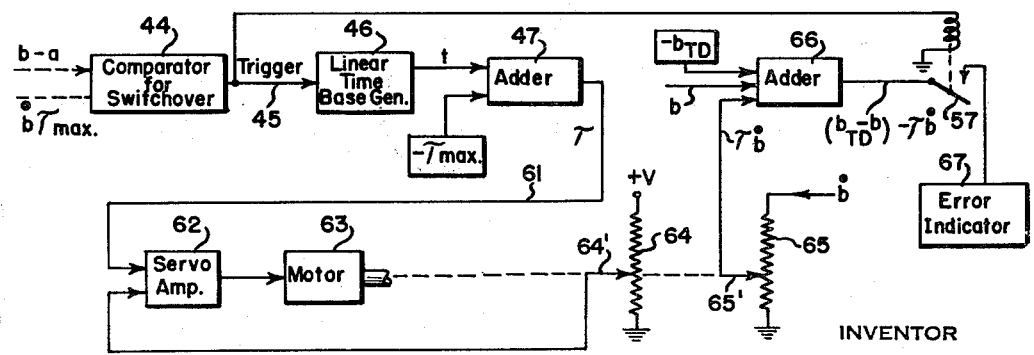
FIG. 4 is a modification of FIG. 3 yielding an error signal in terms of angle error.

Although the pitch attitude rate signal produced by the embodiment of FIG. 3 can be used as an error signal for a pilot indicator, an error signal based on angular error commonly suffices. FIG. 4 shows a modification of the portions of FIG. 3 to the right of dotted line 60.

Referring to FIG. 4, comparator 44 determines switch-over in the manner shown in FIG. 3. The quantity $\tau$ is developed in the same manner at the output of adder 47. However, in this embodiment $\tau$ is supplied through line 61 to a servo-amplifier 62 and motor 63 which drives the slider 64' of potentiometer 64. The potentiometer 64 is supplied with a D.-C. voltage denoted $+V$. In the manner explained before, the position of slider 64' will correspond to $\tau$.

Motor 63 also drives slider 65' of potentiometer 65. The latter is supplied with an input $\dot{b}$ which may be the output of tachometer generator 41 of FIG. 3. Accordingly, the voltage at slider 65' is proportional to $\tau\dot{b}$, as indicated. This is supplied to adder 66 along with the quantities $b$ and $-b_{TD}$. With polarity inversion in adder 66, the output is $(b_{TD}-b)-\tau\dot{b}$, as indicated. This is supplied through switch 57 to the error indicator 67 when switch-over takes place.

From Equation 15 it will be seen that this error signal represents the angular deviation from the prescribed path. In producing this error signal, $\tau$ is used as a multiplier rather than a divider, and consequently may be allowed to go to zero. The constant selected for $\tau_{max}$, and for $\tau_{max}$ in determining switch-over, may be adjusted to suit the characteristics of the aircraft during landing.

Figure 5:
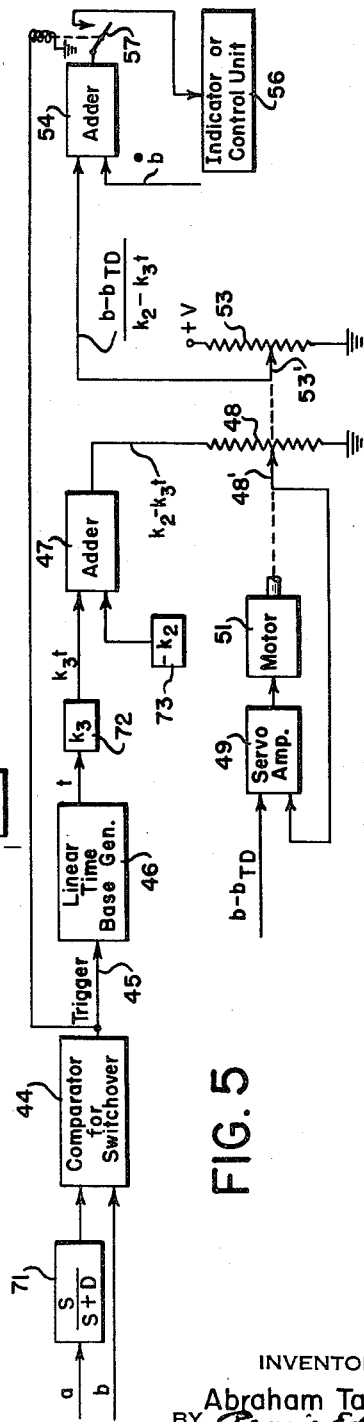
FIG. 5 shows another embodiment of a flare-out computer in accordance with the invention.

FIG. 5 is another embodiment which will yield a suitable path from switch-over to the terminal angle, and provides a somewhat greater degree of freedom in the selection of path over that of FIG. 3. Before describing FIG. 5, the theoretical basis thereof will be given.

A simple form of flare-out path may be expressed as:

$$b+k_1\dot{b}=0 \qquad (20)$$

This equation represents an exponential path from switch-over to touchdown. Being exponential, small departures from the prescribed path may result in a considerable change in the point of touchdown.

In order to establish a fixed terminal angle to touchdown, and provide for a smooth transition to the terminal angle, Equation 20 may be modified as follows:

$$(b-b_{TD})+k_2\dot{b}=0 \qquad (21)$$

Solutions of this equation for angle and rate of change of angle from time of switch-over are as follows, using $b_0$ and $\dot{b}_0$ to represent angle and rate of change thereof at switch-over:

$$(b-b_{TD})=(b_0-b_{TD})e^{-t/k_2} \qquad (22)$$

$$\dot{b}=\dot{b}_0 e^{-t/k_2} \qquad (23)$$

From these equations, it will be noted that the flare-out path exponentially approaches the terminal angle $b_{TD}$, and the rate of change of the angle from the rear site exponentially approaches zero. The time constant $k_2$ may be selected to cause the path to approach the terminal conditions as closely as desired, prior to touchdown, consistent with a gradual flare-out suited to the aircraft.

From Equation 21:

$$\frac{(b-b_{TD})}{-\dot{b}} = k_2 \qquad (24)$$

Thus the prescribed path is one in which the ratio of the angle difference to the rate of change of angle is a constant.

Departures from the prescribed path may be put in the form of an error signal of the type of Equation 14, yielding a pitch attitude rate signal:

$$\text{Pitch attitude rate} = C\left[\frac{(b_{TD}-b)}{k_2} - \dot{b}\right] \qquad (25)$$

Figure 2:
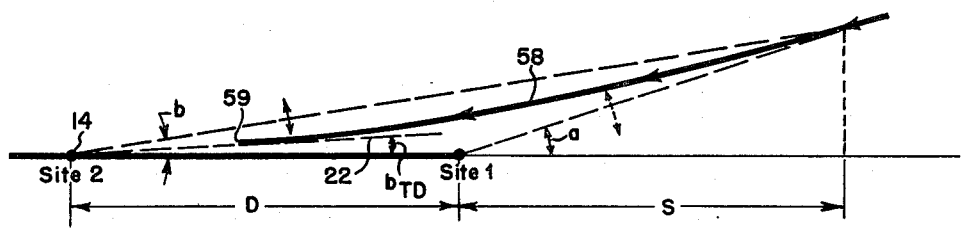

FIG. 2 illustrates a path in accordance with Equation 21. The glide angle $a$ is smaller than in FIG. 1, yielding a shallower landing path 58. Path 58 exponentially approaches the terminal angle of line 22, and touchdown at 59 is in front of Site 2 at a distance primarily determined by the terminal angle and the antenna heights.

The path of Equation 21 will in general be satisfactory for conditions where the initial glide angle is small, say of the order of 3°, and switch over takes place at, say 1½° from the rear site. In such case, the angle and rate of change of angle will decrease to about one-third of their initial values in one time constant. However, in situations where the initial glide angle is greater, it is desirable to modify the path so that the aircraft comes down somewhat more steeply in the initial portions of the flare-out path, providing for a rapid descent with minimum horizontal travel at a low altitude and yet a final shallow terminal angle to touchdown.

This may be accomplished by prescribing the following path:

$$(b-b_{TD}) + (k_2 - k_3 t)\dot{b} = 0 \qquad (26)$$

Here the factor $k_3 t$ is subtracted from $k_2$. At switch-over, where $t$ is zero, the equation is the same as (21). However, after switch-over, the rate of change of angle $b$ must be greater to satisfy the equation, and hence the aircraft arrives more quickly at the terminal angle $b_{TD}$. Solutions for Equation 26 are:

$$(b-b_{TD}) = (b_0 - b_{TD})\left(\frac{k_2 - k_3 t}{k_2}\right)^{1/k_3} \qquad (27)$$

$$\dot{b} = \dot{b}_0\left(\frac{k_2 - k_3 t}{k_2}\right)^{1/k_3 - 1} \qquad (28)$$

These equations represent paths which become tangent to the terminal angle, rather than exponentially approaching it.

By following the procedures used above, the ratio of angle difference to rate of change of angle, and the pitch attitude rate can be expressed as:

$$\frac{(b-b_{TD})}{-\dot{b}} = k_2 - k_3 t \qquad (29)$$

$$\text{Pitch attitude rate} = C\left[\frac{(b_{TD}-b)}{(k_2 - k_3 t)} - \dot{b}\right] \qquad (30)$$

As will be noted, the ratio in Equation 29 decreases as time to touchdown decreases. By suitably selecting the constants and the switch-over point, the aircraft may be brought to substantially the final terminal angle sufficiently ahead of actual touchdown so that variations in speed within limits will not impair a satisfactory landing.

Although there is a considerable range of selection for the constants $k_2$ and $k_3$, certain considerations may be mentioned. It is desirable to avoid a fly-down or pitch-down signal immediately after switch-over, and in general a fly-up or pitch-up signal is desirable. This may be accomplished by suitable selection of $k_2$, taking into account the rate of change of angle from the rear site $(\dot{b})$ existing at switch-over. The constant $k_3$ should in general be greater than zero and less than one.

The switch-over point can be established by a predetermined ratio of the difference in angle from front and rear sites to the rate of change of angle from the rear site, similar to that employed in FIG. 3. However, under adverse weather conditions where sudden gusts momentarily blow the plane up or down, there may be a fairly rapid rate of change of angle even though the angle itself changes very little. Although smoothing of the rate of change may be employed, in FIG. 5, a switch-over dependent on angles only is employed.

From the geometry of FIG. 1, and using the angles rather than tangents, the height $h$ of the aircraft at any point along its landing path may be expressed as:

$$h = aS = b(S+D) \qquad (31)$$

The angle ratio may be expressed as:

$$\frac{b}{a} = \frac{S}{S+D} \qquad (32)$$

Thus, a predetermined ratio of the angles corresponds to a fixed distance of the aircraft from the rear site. This distance may be selected along with the constants $k_2$ and $k_3$ so that the prescribed flare-out path after switch-over will bring the plane substantially to the terminal angle prior to touchdown. A ratio such that $b$ is one-half $a$ or less is commonly desirable.

Referring now to FIG. 5, a computer is shown for instrumenting a flare-out path in accordance with Equations 26 to 30. The switch-over point is determined in accordance with Equation 32.

The angle $b$ signal from the rear site is supplied to comparator 44. The angle $a$ signal from the front site is multiplied by the factor $S/(S+D)$ in block 71. This multiplying factor may be a constant predetermined for the particular aircraft. With a fixed angle $a$, block 71 may be arranged to introduce a constant including the fixed angle.

When the two inputs to comparator 44 are equal, a trigger signal is supplied through the output line 45 to the linear time base generator 46. The output $t$ from 46 is multiplied by the selected constant $k_3$ in block 72, and the output $k_3 t$ is supplied to adder 47. The factor $-k_2$ is supplied from block 73 to adder 47, yielding a signal at the top of potentiometer 48 equal to $k_2 - k_3 t$, as shown.

The quantity $(b-b_{TD})$ is developed as indicated in FIG. 3, and supplied to servo-amplifier 49. The servo-system is like that of FIG. 3, and controls the positions of sliders 48' and 53' as there described. The output at slider 53' is accordingly $(b-b_{TD})/(k_2 - k_3 t)$, as indicated. This is supplied to adder 54.

The angle rate $\dot{b}$ is developed as indicated in FIG. 3 (36-38, 41) and supplied to adder 54. The output of added 54 is hence the pitch attitude rate of Equation 30. This output is supplied to the indicator or control unit 56 through switch 57 which is controlled by the trigger in line 45 in the manner described in connection with FIG. 3.

Provision may be made to place a lower limit on the quantity $(k_2 - k_3 t)$ to prevent it from going to zero, as discussed in connection with FIG. 3. From Equations 27 and 28, it will be seen that such a lower limit causes the actual terminal angle to differ slightly from the selected value of $b_{TD}$, and the terminal rate of change to be very small rather than zero.

To obtain an error signal in terms of angle for a pilot error indicator, FIG. 4 may be arranged to perform a computation in accordance with Equation 26 by calculating $(k_2-k_3t)$ as shown in FIG. 5, and supplying this quantity to servo-amplifier 62 rather than $\tau$. The output from adder 66 will then be proportional to $$(b_{TD}-b)-(k_2-k_3t)\dot{b}$$

The computer of FIG. 5 may be modified to establish a path in accordance with Equations 21–24 by eliminating the time base generator 46, block 72 and adder 47, and supplying $+k_2$ to the top of potentiometer 48. The signal at slider 53' will then correspond to $(b-b_{TD})/k_2$, yielding the desired output from adder 54 in accordance with Equation 25.

The detailed manner in which the computations are carried out, and the types of computing elements employed, may vary widely from the embodiments of FIGS. 3–5, as will be understood by those skilled in the art. Also, other specific paths from switch-over to terminal angle may be used if desired. In general angle and rate of change of angle relationships are computed which, if satisfied, will yield the desired flare-out path. Departures from these relationships are then used to produce an error signal.

The switch-over arrangement of FIG. 3 may be used in FIG. 5, and vice versa. Or, other arrangements for producing switch-over at a desired point may be employed if desired.

In general, the flare-out paths provided are self-healing. That is, if sudden gusts of wind blow the aircraft up or down, or the pilot fails to follow the indicated path, the instrumentation automatically calculates a new path which will bring the aircraft to the final terminal angle satisfactorily.

The invention has been described in connection with several specific embodiments thereof, and the theoretical basis thereof has been set forth. It will be understood that modifications and refinements may be made as suits the requirements and conditions of a given application.

I claim:

1. In an aircraft landing system utilizing guidance signals corresponding to elevation guidance beam transmissions from a plurality of sites adjacent a runway and spaced therealong, at least the signal corresponding to a rearward beam transmission representing a function of the elevation angle of the aircraft from the site thereof as the angle changes during landing, a flare-out path computer which comprises means for establishing a switch-over point from glide to flare-out portions of the landing path, computing means utilizing the rearward site angle signal for computing angle and angular rate of change relationships for a flare-out path from the switch-over point to a substantially constant shallow terminal angle with respect to the rearward site, and means for producing an error signal representing departures of the aircraft from the computed relationships and terminal angle to touchdown.

2. In an aircraft landing system utilizing guidance signals corresponding to elevation guidance beam transmissions from a plurality of sites adjacent a runway and spaced therealong, at least the signal corresponding to a rearward beam transmission representing a function of the elevation angle of the aircraft from the site thereof as the angle changes during landing, a flare-out path computer which comprises means for utilizing the glide angle of the aircraft and said rearward site angle signal to establish a switch-over point from glide to flare-out portions of the landing path, means for establishing a predetermined shallow terminal angle with respect to the rearward site for touchdown, computing means utilizing the rearward site angle signal for computing angle and angular rate of change relationships for a flare-out path from the switch-over point to the terminal angle, said flare-out path substantially reaching the terminal angle prior to touchdown, and means for producing an error signal representing departures of the aircraft from the computed relationships and terminal angle to touchdown.

3. In an aircraft landing system utilizing guidance signals corresponding to elevation guidance beam transmissions from a plurality of sites adjacent a runway and spaced therealong, at least the signal corresponding to a rearward beam transmission representing a function of the elevation angle of the aircraft from the site thereof as the angle changes during landing, a flare-out path computer which comprises means for utilizing the glide angle of the aircraft and said rearward site angle signal to establish a switchover point from glide to flare-out portions of the landing path, means for establishing a predetermined shallow terminal angle with respect to the rear site for touchdown, computing means for computing relationships between the difference in angle of the aircraft from the rear site and a predetermined terminal angle and the rate of change of angle from the rear site for a flare-out path from the switch-over point to the terminal angle, said flare-out path substantially reaching the terminal angle prior to touchdown, and means for producing an error signal representing departures of the aircraft from the computed relationships and terminal angle to touchdown.

4. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for establishing a switch-over point from glide to flare-out portions of the landing path, means for producing a flare-out angle difference signal corresponding to the difference between the angle of the aircraft from the rear site and a predetermined terminal angle with respect to the rear site, computing means utilizing said flare-out angle difference signal and the rate of change of the rear site angle signal for computing angle and angular rate of change relationships for a flare-out path from the switch-over point to the terminal angle, said flare-out path substantially reaching the terminal angle prior to touchdown, and means for producing an error signal representing departures of the aircraft from the computed relationships and terminal angle to touchdown.

5. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for utilizing the glide angle of the aircraft and said rearward site angle signal to establish a switch-over point from glide to flare-out portions of the landing path, means for producing a flare-out angle difference signal corresponding to the difference between the angle of the aircraft from the rear site and a predetermined terminal angle with respect to the rear site for touchdown, computing means for computing a proportional relationship between the flare-out angle difference signal and the rate of change of the rear site angle signal corresponding to a flare-out path from the switch-over point to the terminal angle, said flare-out path substantially reaching the terminal angle prior to touchdown, and means for producing an error signal representing departures of the aircraft from the computed relationships and terminal angle to touchdown.

6. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for utilizing the glide angle of the aircraft and said rear site angle signal to establish a switch-over point from glide to flare-out portions of the landing path, means for producing a flare-out angle difference signal corresponding to the difference between the angle of the aircraft from the rear site and a predetermined terminal angle with respect to the rear site for touchdown, computing means for computing a substantially constant proportional relationship between the flare-out angle difference signal and the rate of change of the rear site angle signal after the switch-over point, the constant of proportionality being predetermined to yield a flare-out path substantially reaching the terminal angle prior to touchdown, and means for producing an error signal corresponding to departures from said proportional relationship and terminal angle.

7. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for utilizing the glide angle of the aircraft and said rear site angle signal to establish a switch-over point from glide to flare-out portions of the landing path, means for producing a flare-out angle difference signal corresponding to the difference between the angle of the aircraft from the rear site and a predetermined terminal angle with respect to the rear site, computing means for computing a proportional relationship between the flare-out angle difference signal and the rate of change of the rear site angle signal after said switch-over point, said proportional relationship corresponding to a ratio of angle difference to rate of change of angle which decreases as the time to touchdown decreases, and means for producing an error signal corresponding to departures from said proportional relationship.

8. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for utilizing the glide angle of the aircraft and said rear site angle signal to establish a switch-over point from glide to flare-out portions of the landing path, means for producing a flare-out angle difference signal corresponding to the difference between the angle of the aircraft from the rear site and a predetermined terminal angle with respect to the rear site for touchdown, computing means for computing a proportional relationship between the flare-out angle difference signal and the rate of change of the rear site angle signal after said switch-over point, said proportional relationship corresponding to a ratio of angle difference to rate of change of angle which is substantially directly proportional to time remaining before substantially reaching the terminal angle, and means for producing an error signal corresponding to departures from said proportional relationship.

9. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for utilizing the glide angle of the aircraft and said rear site angle signal to establish a switch-over point from glide to flare-out portions of the landing path, means for producing a flare-out angle difference signal corresponding to the difference between the angle of the aircraft from the rear site and a predetermined terminal angle with respect to the rear site, computing means for computing a proportional relationship between the flare-out angle difference signal and the rate of change of the rear site angle signal after said switch-over point, said proportional relationship corresponding to a ratio of angle difference to rate of change of angle which is substantially equal to $k_2 - k_3 t$, where $t$ is time elapsed after switch-over and $k_2$ and $k_3$ are constants predetermined to yield a flare-out path substantially reaching the terminal angle prior to touchdown, and means for producing an error signal corresponding to departures from said proportional relationship.

10. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means responsive to the glide angle of the aircraft and the angle from the rear site for establishing a switch-over point when the ratio of the difference between said angles to the rate of change of angle from the rear site is substantially equal to a predetermined constant, means for producing a flare-out angle difference signal corresponding to the difference between the angle from the rear site and a predetermined terminal angle with respect to the rear site, computing means for computing a proportional relationship between the flare-out angle difference signal and the rate of change of the rear site angle signal after said switch-over point, said proportional relationship corresponding to a ratio of angle difference to rate of change of angle which decreases as the time to touchdown decreases, and means for producing an error signal corresponding to departures from said proportional relationship.

11. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means for computing the difference between the angles of the aircraft from front and rear sites during the glide portion of the landing path and yielding a corresponding signal, means for computing the rate of change of the angle from the rear site and yielding a corresponding signal, means responsive to a predetermined ratio between said difference and rate of change signals corresponding to approximate time to touchdown for establishing a switch-over point from glide to flare-out portions of the landing path, means for subtracting time elapsed after switch-over from said approximate time to touchdown to yield a signal $\tau$ corresponding to approximately time remaining before touchdown, means for subtracting a predetermined constant terminal angle signal from the angle signal corresponding to the rear site to yield a flare-out angle difference signal, means for dividing the flare-out angle difference signal by the $\tau$ signal to yield a resultant signal, and means for producing an error signal corresponding to departures from substantial equality of said resultant signal and said signal corresponding to the rate of change of angle from the rear site.

12. In an aircraft landing system utilizing guidance signals corresponding to elevation guidance beam transmissions from a pair of sites adjacent a runway and spaced therealong, at least the signal corresponding to the rear beam transmission being substantially proportional to the elevation angle of the aircraft from the rear site as the angle changes during landing, a flare-out path computer which comprises means responsive to the glide angle of the aircraft and said rear site angle signal for establishing a switch-over point from glide to flare-out portions of the landing path when the angles reach a predetermined ratio, means for computing a signal $k_3 t$ where $k_3$ is a predetermined constant and $t$ is time elapsed after switch-over, means for computing a signal $(k_2 - k_3 t)$ where $k_2$ is a predetermined constant, means for computing a signal $(b - b_{TD})$ where $b$ is the angle from the rear site and $b_{TD}$ is a predetermined constant terminal angle, means for dividing the signal $(b - b_{TD})$ by the signal $(k_2 - k_3 t)$ to yield a resultant signal, means for computing the rate of change of the angle from the rear site and yielding a corresponding angle rate signal, and means for producing an error signal corresponding to departures from substantial equality of said resultant signal and said angle rate signal, the constants $k_2$ and $k_3$ being predetermined with respect to the switch-over point to establish a flare-out path substantially reaching said terminal angle prior to touchdown.

References Cited by the Examiner
UNITED STATES PATENTS 2,987,275 6/61 Moncrieff-Yates et al.
3,052,427 9/62 Match et al. _____ 343—108 X CHESTER L. JUSTUS, *Primary Examiner.*